(12) United States Patent
Toyoda

(10) Patent No.: US 6,836,789 B1
(45) Date of Patent: Dec. 28, 2004

(54) APPARATUS AND METHOD FOR TRANSMITTING IMAGE

(75) Inventor: Kiyoshi Toyoda, Kunitachi (JP)

(73) Assignee: Panasonic Communications Co., Ltd., Fukuoka (JP)

(*) Notice: Subject to any disclaimer, the term of this patent is extended or adjusted under 35 U.S.C. 154(b) by 0 days.

(21) Appl. No.: 09/568,128

(22) Filed: May 10, 2000

(30) Foreign Application Priority Data

Oct. 8, 1999 (JP) .......................................... 11-287897

(51) Int. Cl.[7] .............................................. G06F 15/16
(52) U.S. Cl. ...................... 709/206; 709/203; 709/217; 709/224; 358/402; 358/404; 358/442
(58) Field of Search ................................ 709/206, 203, 709/209, 217, 224, 228, 230, 232, 245; 358/1.15, 402, 404, 405, 434, 442

(56) References Cited

U.S. PATENT DOCUMENTS

| | | | | |
|---|---|---|---|---|
| 5,812,278 A | * | 9/1998 | Toyoda et al. | 358/402 |
| 5,872,845 A | * | 2/1999 | Feder | 358/442 |
| 5,877,746 A | | 3/1999 | Parks et al. | |
| 5,881,233 A | * | 3/1999 | Toyoda et al. | 709/233 |
| 6,101,548 A | * | 8/2000 | Okada | 709/236 |
| 6,119,234 A | * | 9/2000 | Aziz et al. | 713/201 |
| 6,457,044 B1 | * | 9/2002 | IwaZaki | 709/206 |
| 6,608,694 B1 | * | 8/2003 | Akimoto | 358/1.15 |

FOREIGN PATENT DOCUMENTS

| | | |
|---|---|---|
| EP | 0851340 | 7/1998 |
| EP | 0881824 | 12/1998 |
| JP | 8-242326 | 9/1996 |
| JP | 10040183 | 2/1998 |

OTHER PUBLICATIONS

An English Language abstract of JP 10–040183.

* cited by examiner

Primary Examiner—Saleh Najjar
Assistant Examiner—LaShonda Jacobs
(74) Attorney, Agent, or Firm—Greenblum & Bernstein, P.L.C.

(57) ABSTRACT

IFAX determines whether IFAX transmission processing or network scanner processing should be performed based on whether a start button or a scanner button is pressed on after an operator inputs a destination mail address. In a case of performing IFAX transmission processing, a journal is superimposed on an original image and e-mail is transmitted to the IFAX via a mail server. While, in a case of performing network scanner processing, the IFAX does not perform the creation of journal, bitmapping, compression, and combination with the original image. Therefore, the original image can be transferred to a PC without superimposing the journal thereon. This prevents the trouble in which the journal hinders the PC from dealing with the original image.

29 Claims, 18 Drawing Sheets

APPARATUS AND METHOD FOR TRANSMITTING IMAGE

BACKGROUND OF THE INVENTION

1. Field of the Invention

The present invention relates to an apparatus and a method for transmitting image.

2. Description of the Related Art

Conventionally, there are proposed Internet facsimile apparatuses (hereinafter referred to as IFAX) as disclosed in Unexamined Japanese Patent Publication HEI 8-242326 and the corresponding U.S. Pat. No. 5,881,233.

The IFAX scans each page of an original by use of a scanner, and obtains a plurality of image data at a transmitting time. Then, the IFAX sends e-mail to which image data is appended to the IFAX of a receiving side. The IFAX of the receiving side prints image data appended to e-mail by use of a printer.

At this time, the IFAX of the transmitting side superimposes a so-called journal on each image data in the same manner that the ordinary facsimile apparatus. This makes it possible for the receiver to know a transmission date, sender, page number, and the like since the journal is included in the printed material when the IFAX of the receiving side prints image data.

By the way, there is a network scanner as one of uses of IFAX. For example, The network scanner aims to process image data obtained by scanning the original and to store the processed image data, by use of PC, etc. In the case of using IFAX as the network scanner, the IFAX appends a plurality of image data obtained by scanning the original to e-mail, and transmits this e-mail to a specific mail address in the same manner as the above-mentioned image communications by the IFAX. An operator gains access to the mail server, which manages this mail address, and receives this e-mail by use of a PC, which deals with image data.

In the case of using the conventional IFAX as the network scanner as explained above, the journal included in image data often hinders an operator from seeing the image. Also, since image data is transmitted to the operator's mail address using e-mail, it is required that the operator receive e-mail to which image data is appended from the mail server by use of the operator's PC after scanning the original by the IFAX.

SUMMARY OF THE INVENTION

It is an object of the present invention is to provide an image transmitting apparatus that matches both uses of a network scanner and the IFAX, and to provide the image transmitting method.

In order to achieve the above object, a communication management information (journal) is superimposed on image information in the case of using the image transmitting apparatus as communications, and no journal is superimposed thereon in the case of using the image transmitting apparatus as image scanning.

Therefore, no journal is superimposed on image information in the case of using the image transmitting apparatus as image scanning, thereby making it possible to prevent the trouble in which the journal hinders a receiver side from seeing the image.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

First to fifth embodiments of the present invention will be specifically described with reference to the drawings accompanying herewith.

First Embodiment

Figure 1:
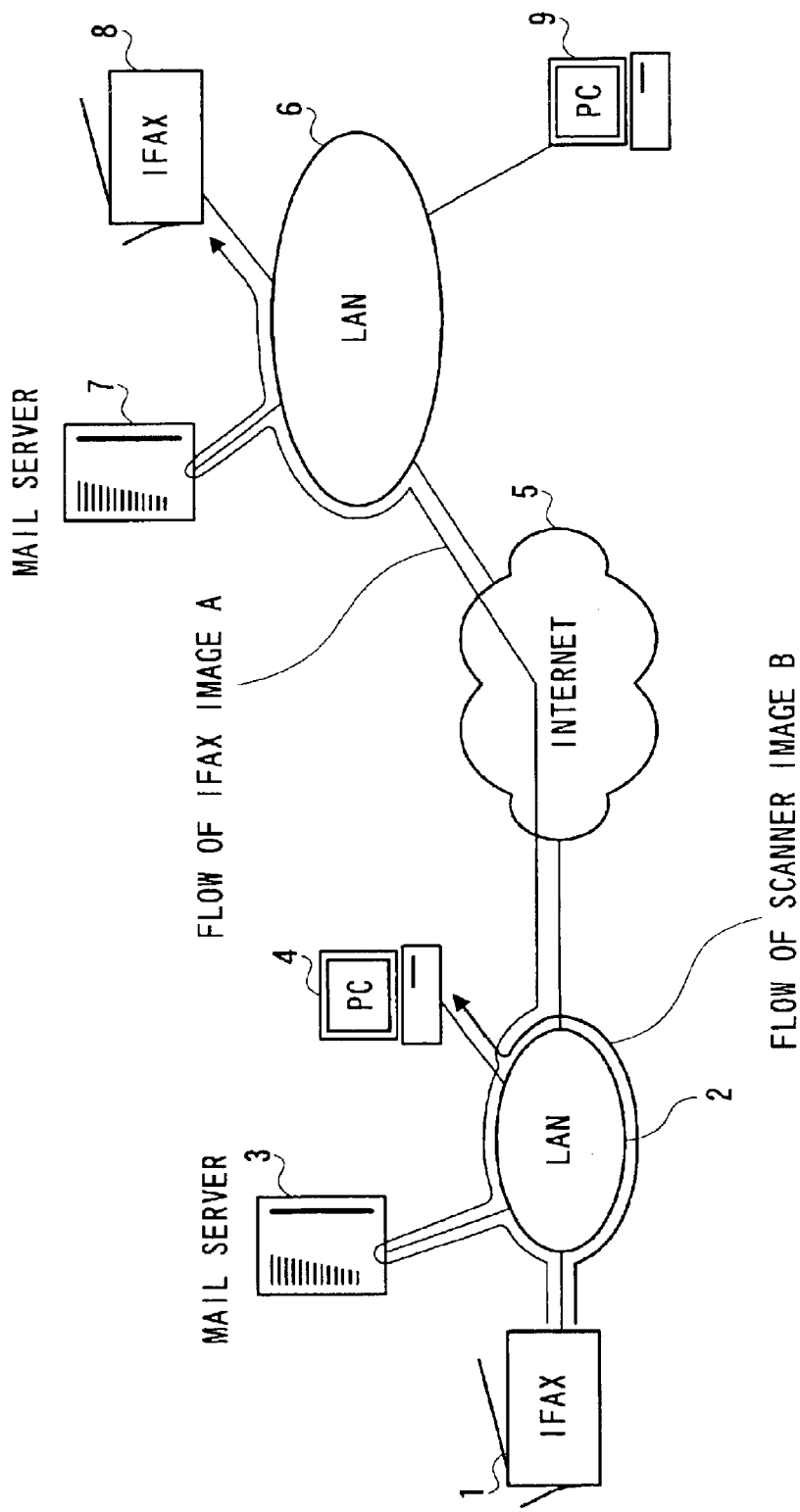
FIG. 1 is a conceptual view showing a network system where an image transmitting apparatus according to a first embodiment of the present invention operates.

FIG. 1 is a conceptual view showing a network system where an image transmitting apparatus according to a first embodiment of the present invention operates.

An Internet facsimile apparatus (hereinafter referred to as IFAX) 1 according to the first embodiment is connected to a local area network (LAN) 2. A mail server 3 and a personal computer (PC) 4, which are set up on the same premises as IFAX 1, are connected to the LAN 2. The LAN 2 is also connected to The Internet 5. The other LAN 6 is connected to the Internet 5. A mail server 7 and an IFAX 8, and a PC 9 are connected to the LAN 6.

The IFAX 1 transmits and receives image information and the like between the IFAX 1 and IFAX 8 using e-mail. As shown by an arrow A of FIG. 1, e-mail is transmitted to the mail server 3 of a transmitting side. The mail server 3 of the transmitting side transfers e-mail to the mail server 7 of a receiving side. The mail server 7 of the receiving side stores this e-mail. The IFAX 8 of the receiving side obtains access to the mail server 7 of the receiving side, and receives e-mail. This processing is called IFAX transmission processing. While, the IFAX 1 directly transmits image data, as shown by an arrow B of FIG. 1, obtained by scanning an original by a scanner (hereinafter referred to as a scanner image) to the PC 4. This processing is called network scanner processing. The IFAX 1 performs the transfer of e-mail between the mail server 3 and PC 4 in accordance with a mail transfer protocol, for example, SMTP (Simple Mail Transfer Protocol).

Figure 2:
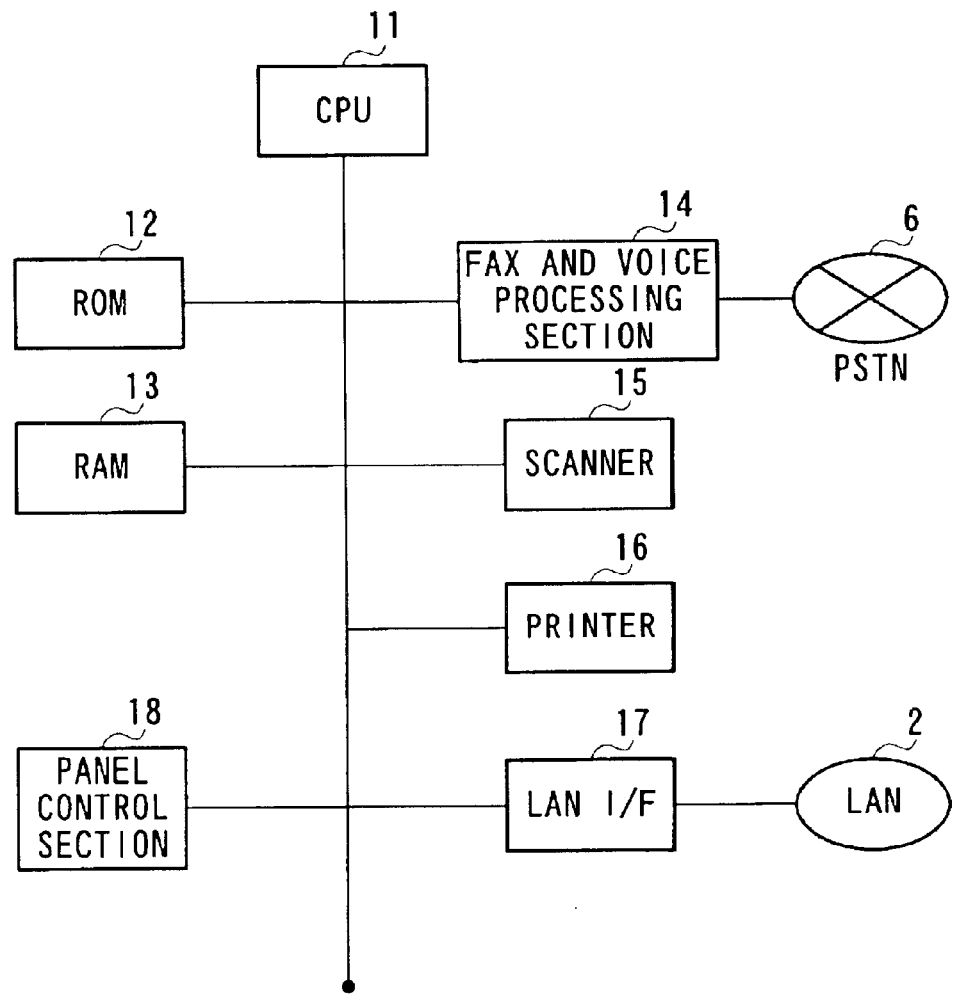
FIG. 2 is a block diagram showing hardware of an Internet facsimile apparatus according to the first embodiment.

FIG. 2 is a block diagram showing hardware of an Internet facsimile apparatus according to the first embodiment. A CPU 11 executes a program, and performs control of the entirety of the apparatus. A ROM 12 stores the program, which is executed by the CPU 11.

The RAM 13 has a work area where the program is executed and a buffer area where data of various kinds such as e-mail and an image file, and the like is temporarily stored.

A FAX and voice processing section 14 modulates facsimile data and a voice, and outputs modulated data to a public switched telephone network (PSTN) 6, and demodulates modulated data received from the PSTN 6 to facsimile data and voice data.

A scanner 15 scans an original, and obtains image information. A printer 16 prints various kinds of data including image information received.

A LAN interface 17 executes a protocol, which is necessary for transmitting and receiving data on the LAN 2.

A panel control section 18 comprises dial keys and a touch panel, and receives operations such as a specification of a communication partner, an instruction of a transmission start, etc., which are executed by an operator.

Figure 3:
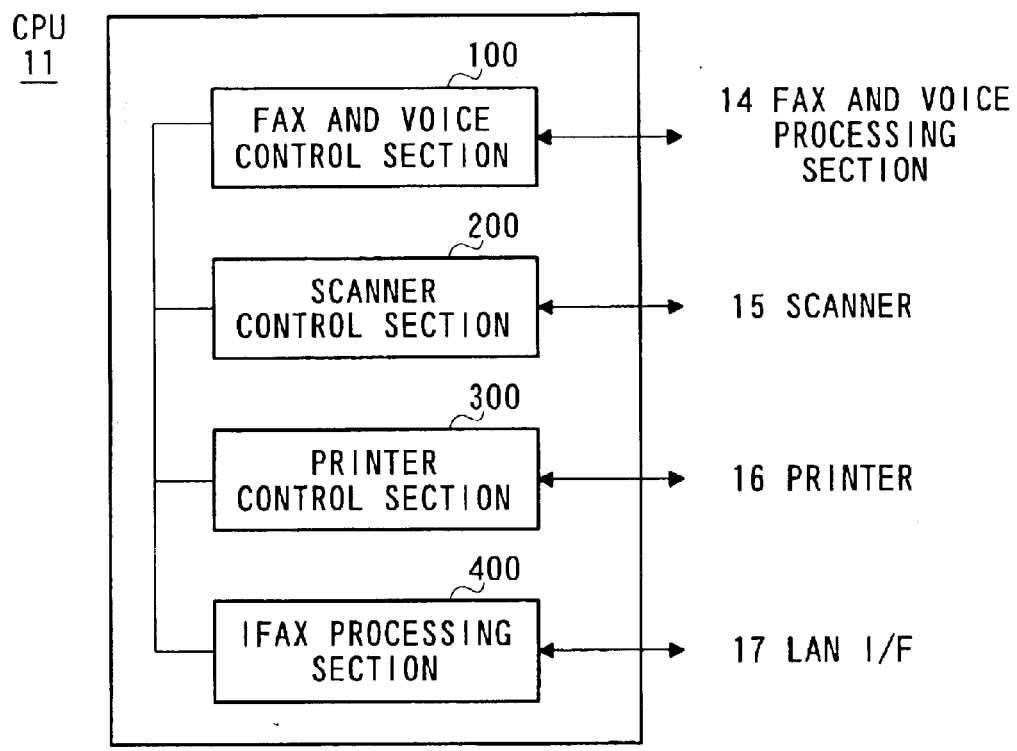
FIG. 3 is a block diagram showing a function of the Internet facsimile apparatus according to the first embodiment.

The ROM 12 stores the program, and the CPU 11 executes the program. The function, which is resultantly implemented, is explained as follows. FIG. 3 is a block diagram showing the function of the IFAX 1 according to the first embodiment.

The IFAX 1 comprises a FAX and voice controlling section 100, a scanner controlling section 200, and a printer controlling section 300 to control each of the FAX and voice processing section 14, the scanner 15, and the printer 16.

The IFAX 1 also comprises an IFAX processing section 400, which implements the function as IFAX. This IFAX processing section 400 transmits and receives e-mail via the LAN 2 by use of the LAN interface 17. In other words, the IFAX processing section 400 receives e-mail from a sender, and prints received data by use of the printer 16. At this time, if an image file is appended to e-mail the content of the image file is printed by the printer 16. While, the IFAX processing section 400 converts image information obtained by the scanner 15 to e-mail, and transmits it.

Figure 4:
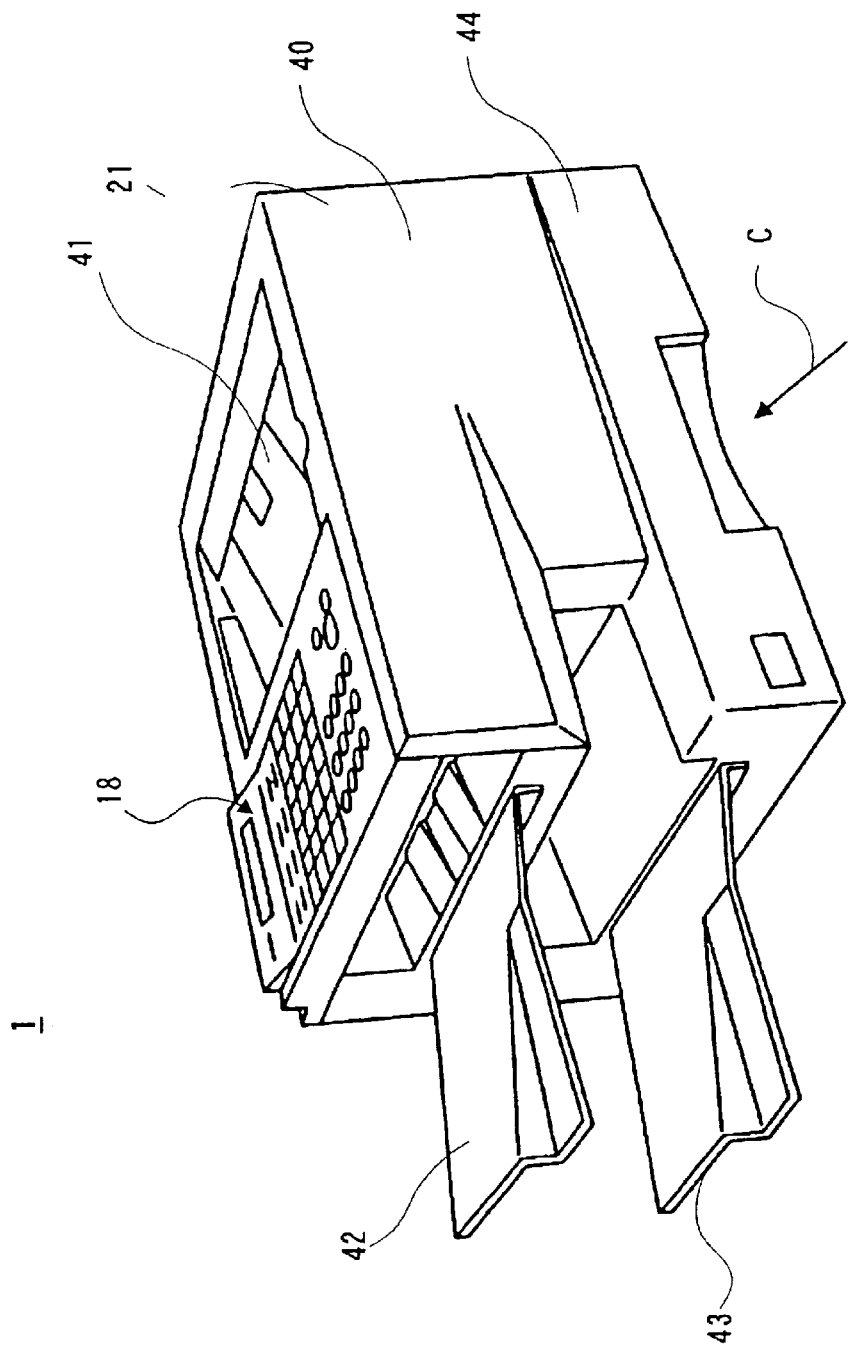
FIG. 4 is a perspective view showing an exterior of the Internet facsimile apparatus according to the first embodiment.

FIG. 4 is a perspective view showing an exterior of the Internet facsimile apparatus according to the first embodiment of the present invention. The following will explain a case in which the IFAX 1 is seen from the direction shown by an arrow C of FIG. 4. In the IFAX 1, the scanner 15 and the printer 16 are integrated into a housing 40 together with other structural elements, that is, CPU 11, ROM 12, RAM 13, FAX and voice processing section 14, LAN interface 17, and panel control section 18. The panel control section 18 is provided at the left surface side, which is an upper surface portion of the IFAX 1. The original plate 41 41 for supplying an original to the scanner 15 is provided at the right side of the panel control section 18. Paper discharge trays 42 and 43 for receiving printed materials discharged from the printer 16 are vertically provided at the left side surface portion of the IFAX 1. A paper feeder section 44 for feeding printing paper to the printer 16 is provided at a bottom surface portion of the IFAX 1.

Figure 5:
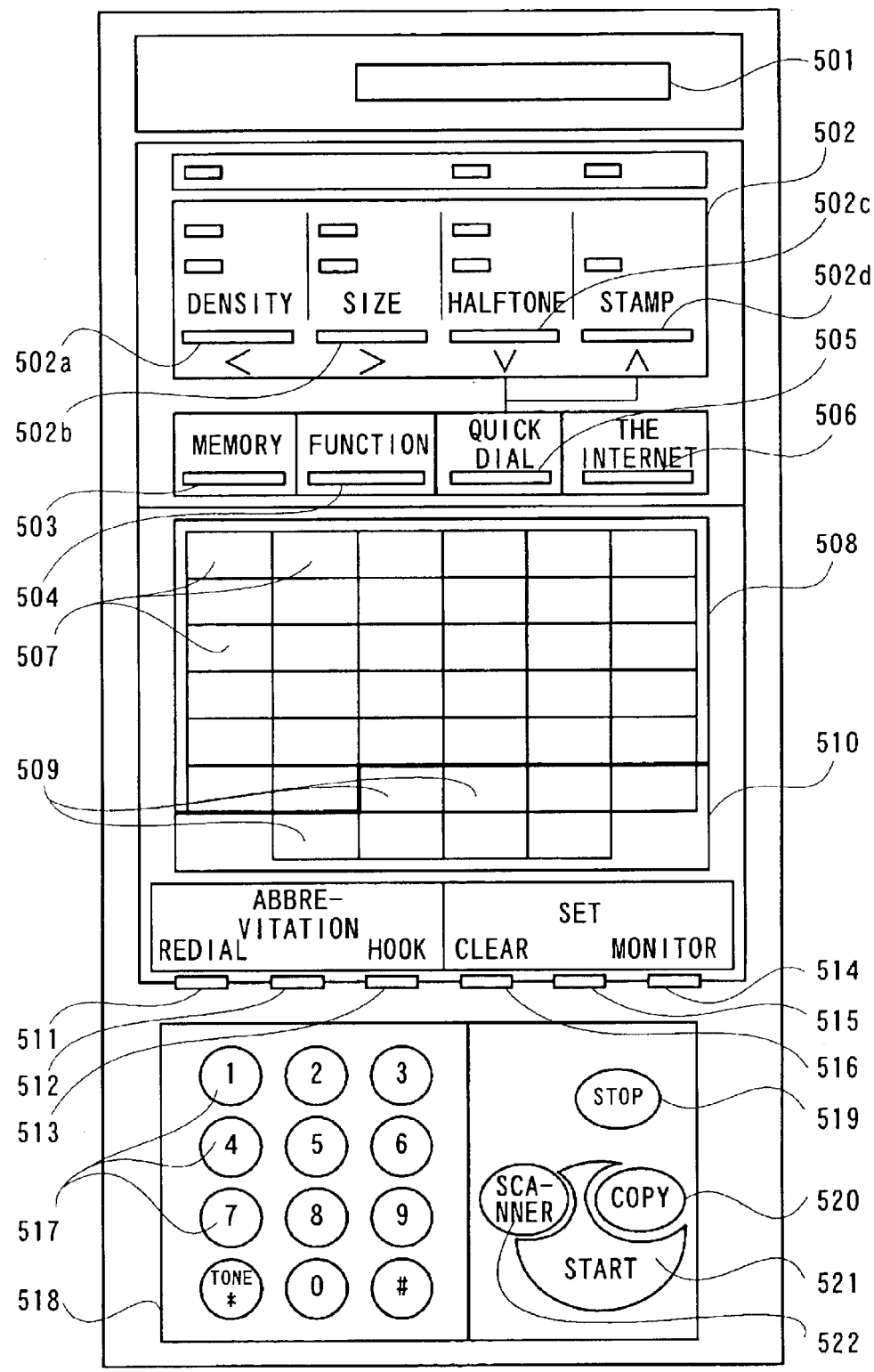
FIG. 5 is a plane view showing a panel control section of the Internet facsimile apparatus according to the first embodiment.

FIG. 5 is a plane view showing the panel control section 18 of the Internet facsimile apparatus according to the first embodiment.

The panel control section 18 has a display section 501, formed of, for example, an LCD, formed at the top. At the lower side of this display section 501, there is provided a print setting section 502 wherein a plurality of print setting buttons 502a to 502d for performing the print setting such as print density, character size, halftone and stamp, are arranged.

At the lower side of the print setting section 502, a memory button 503, a function button 504, a quick dial button 505, and an Internet button 506 are arranged in order from left. Among these buttons, the Internet button 506 is one that is used to perform the switching to an input mode for Internet facsimile communications under an operator's direction.

At the lower side of these buttons 503 to 506, there is provided a one-touch button section 508 wherein a plurality of one-touch buttons 507 are arranged. Moreover, at the lower side of the one-touch button section 508, there is provided a program communication section 510 wherein a plurality of program buttons 509 are arranged. At the lower side of the program communication section 510, a redial/pose button 511, an abbreviated dialing butt 512, a sub-address/hook button 513, a clear/monitor volume button 516, a set button 515, and a monitor button 514 are arranged in order from left.

At the lower side of these buttons 512 to 516 that is a left side portion other than the center, there is provided a numeric keypad section 518 wherein a plurality of buttons 517 is arranged. At the left side of the numeric keypad section 518, a stop button 519, a copy button 520, a start button 521, and a scanner button 522 are arranged.

The start button 521 is one that is provided to instruct the start of transmission processing of IFAX or e-mail, and the scanner button 522 is one that is used to execute the operation of the network under an operator's direction.

Figure 6:
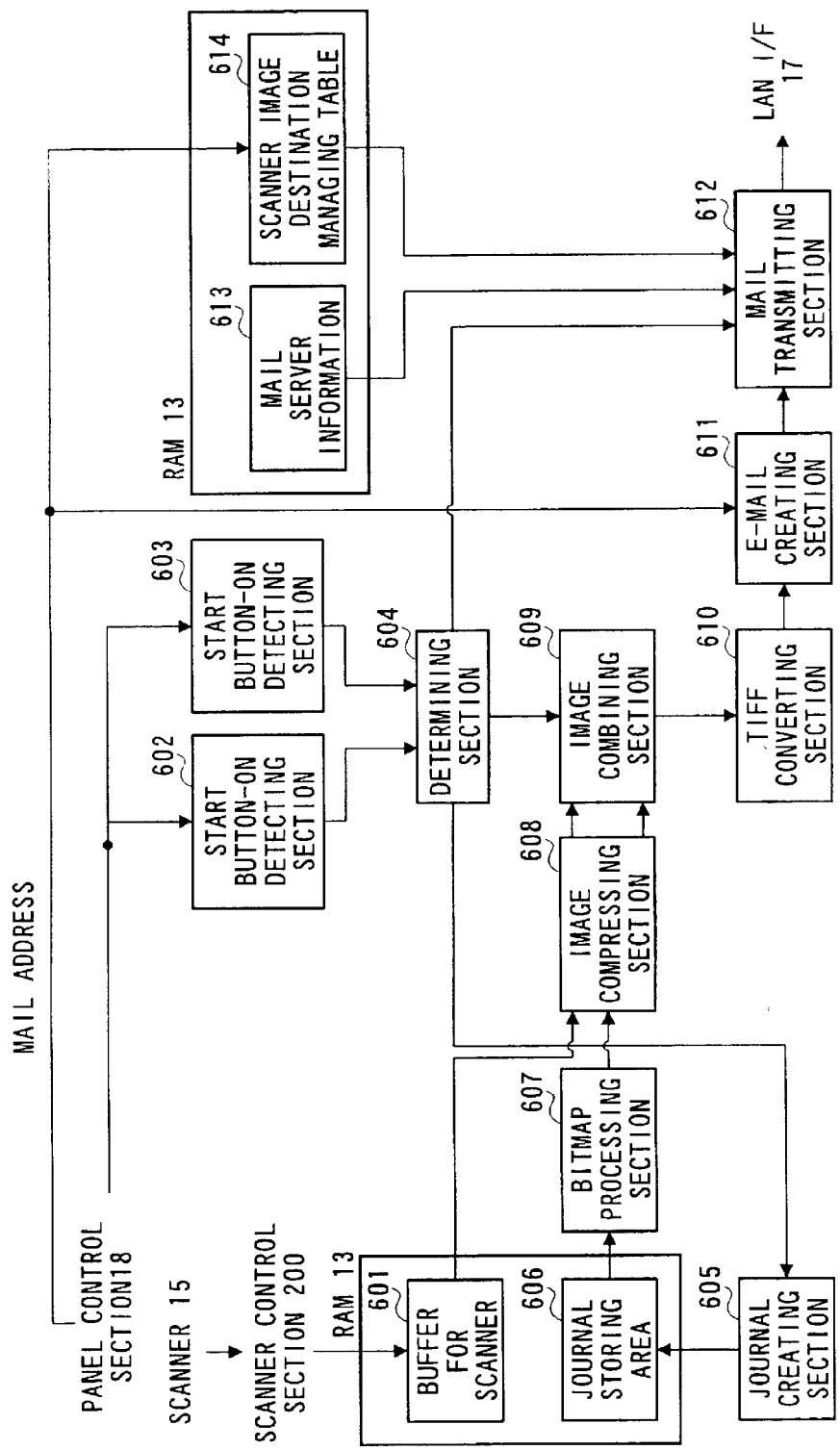
FIG. 6 is a functional block diagram showing an IFAX processing section of the Internet facsimile apparatus according to the first embodiment.

FIG. 6 is a functional block diagram showing the IFAX processing section 400 of the IFAX according to the first embodiment.

The scanner control section 200 stores raw image data, which has been obtained when the scanner 15 scans the original, that is, bitmap data in this example, to a buffer 601 for scanner prepared in the RAM 13. The image obtained by scanning the original is hereinafter referred to as an original image.

A start button-on detecting section 602 and a scanner button-on detecting section 603 detects a depression of the start button 521 and the scanner button 522 respectively, then transmits a detection results to a determining section 604.

The determining section 604 determines whether or not IFAX transmission processing or network scanner processing should be performed on the basis of the detection results. More specifically, if the start button-on detecting section 602 detects the depression of the start button 521, the determining section 604 determines that IFAX transmission processing is performed. While, if the scanner button-on detecting section 603 detects the depression of the scanner button 522, the determining section 604 determines that network scanner processing is performed.

A journal creating section 605 creates a journal in IFAX transmission processing, and stores it to a journal storing area 606 provided in the RAM 13. The journal means, for example, sender information (name or title, mail address, FAX number, etc.), transmission date and time, destination information (name or title, mail address, FAX number, etc.), and page information (page number, total number of pages), and they are generally added to a header of image information or a footer.

A bitmap processing section 607 bitmaps the journal stored in the journal storing area 606 in IFAX transmission processing. An image compressing section 608 compresses the original image (bitmap data) stored in a buffer 601 for a scanner and/or the bitmapped journal, respectively. As the compression format here, MH, MR, MMR and the like are used. An image combining section 609 combines compressed data of the original image and that of the journal with each other. Herein, the original image and the journal are prepared in unit of one page of the original, and these compression and combination are also performed in unit of one page of the original.

In the network scanner processing, the creating of the journal, the bitmapping, the compression and the combination are not performed.

A TIFF converting section 610 converts a plurality of compressed data to one ITFF (Tagged Image File Format) file. Herein, one compressed data corresponds to one page of the original.

An e-mail creating section 611 creates e-mail directing to a destination mail address input from the panel control section 18. Here, the e-mail creating section 611 converts the TIFF file obtained by the TIFF converting section 610 to text code data, and adds this text code data to a multi-part mail in accordance with MIME (Multipurpose Internet Mail Extension), and generates e-mail to which image information is appended.

In IFAX transmission processing, a mail transmitting section 612 transmits e-mail generated by the e-mail creating section 611 to the mail server 3 of the transmitting side via the LAN interface 17 in accordance with a mail transfer protocol, that is, SMTP (Simple Mail Transfer Protocol) in this example. The mail transmitting section 612 obtains information of the mail server 3 of the transmitting side from a mail server information 613.

In network scanner processing, the mail transmitting section 612 also transmits e-mail to a scanner image destination such as a PC 4, etc., directly without passing through the mail servers 3 and 7. The mail transmitting section 612 performs the transfer of e-mail between the mail transmitting section 612 and software for reception, which is executed by the PC 4 in accordance with SMTP. At this time, since SMTP is used as a communication protocol, it is necessary for the mail transmitting section 612 to know an IP address of PC 4. For this reason, there is prepared a scanner image destination managing table 614 wherein the mail address of PC 4 and the IP address are associated with each other. The mail transmitting section 612 obtains an IP address, which corresponds to the destination mail address of PC 4 input from the panel control section 18, from this scanner image destination managing table 614. This makes it possible to directly transmit the image to the PC 4 from the mail transmitting section 612.

Figure 7:
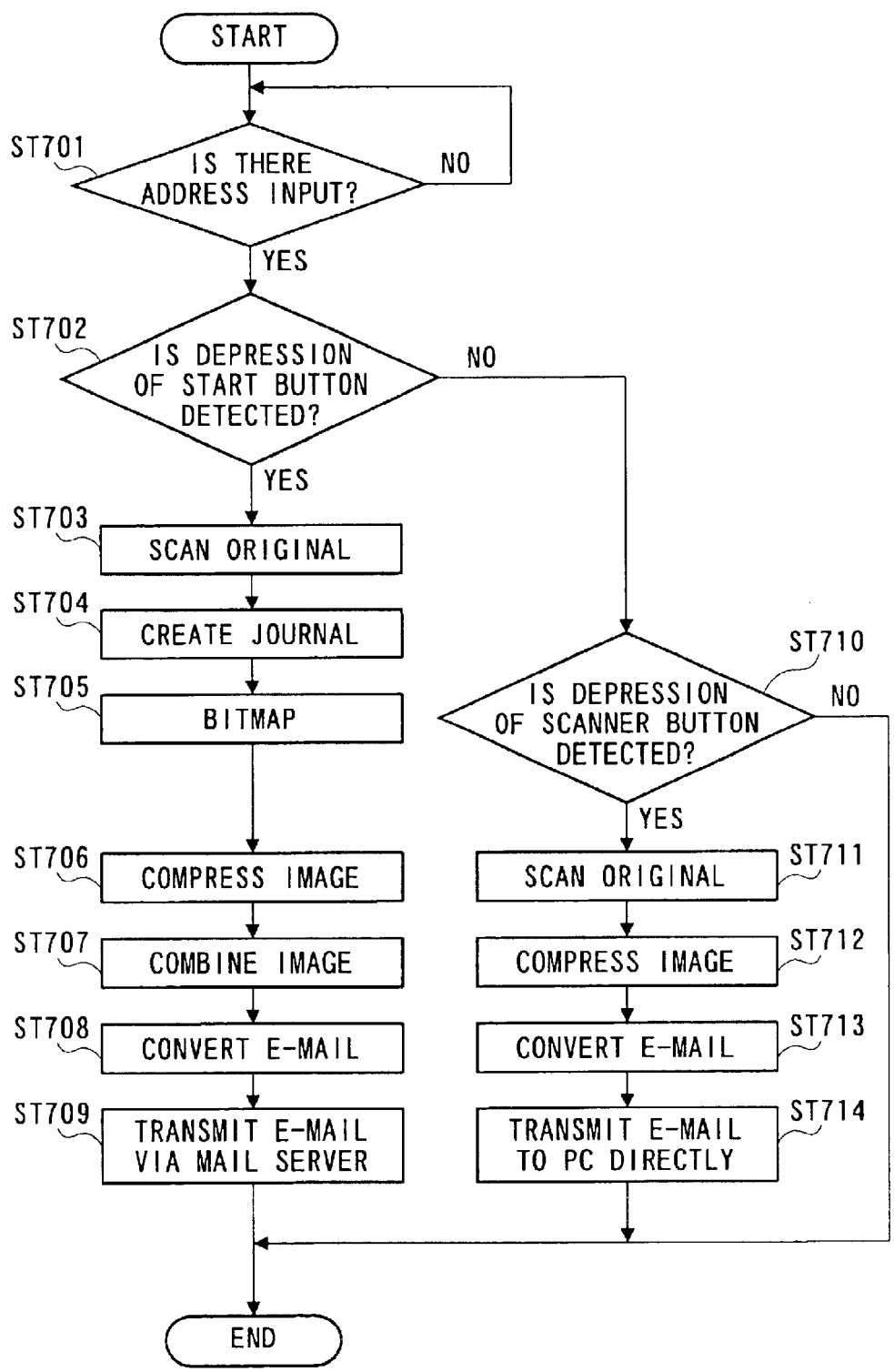
FIG. 7 is a flowchart showing image transmission processing of the Internet facsimile apparatus according to the first embodiment.

Next, an explanation will be given of image transmission processing of the IFAX according to the first embodiment. FIG. 7 is a flowchart showing image transmission processing of the Internet facsimile apparatus according to the first embodiment. In the explanation set forth below, IFAX transmission processing from IFAX 1 to IFAX 8 shown in FIG. 1 and network scanner processing from IFAX 1 to PC 4 will be explained.

After the operator of IFAX 1 places an original on the original plate 41, the operator inputs a mail address from the panel control section 18 and depresses the start button 521 or the scanner button 522. The operator depresses the start button 521 in the case of performing IFAX transmission processing, and depresses the scanner button 522 in the case of performing network scanner processing.

Figure 8:
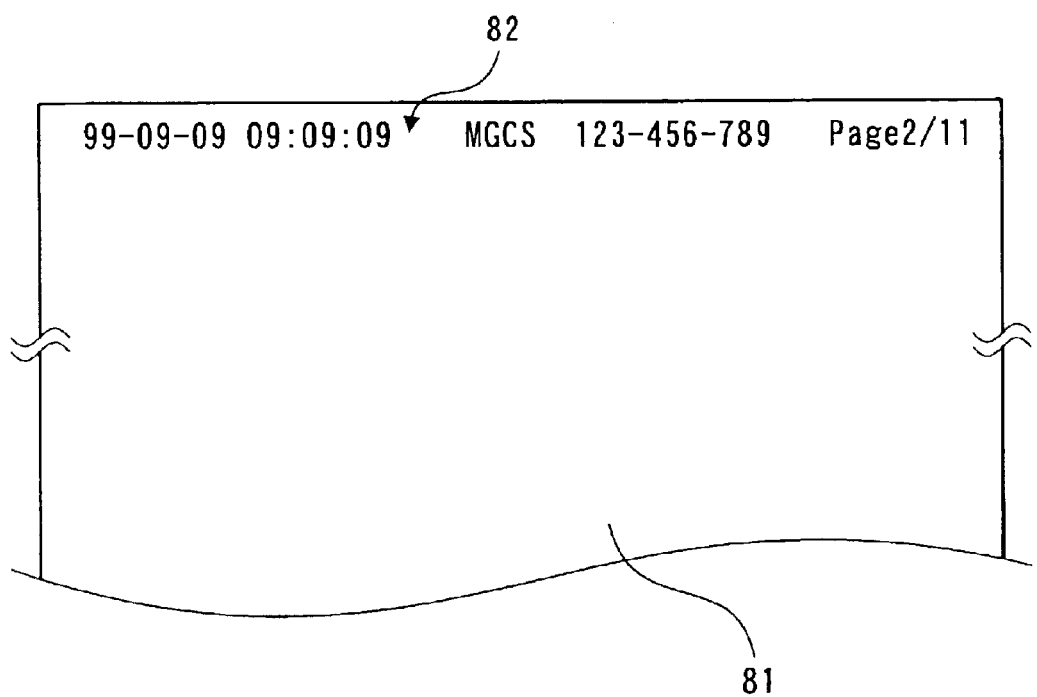
FIG. 8 is a view showing an original image on which a journal is superimposed according to the first embodiment.

In step (herein after referred to as ST) 701, if there is an input of mail address from the panel control section 18, the determining section 604 determines whether or not the start button-on detecting section 602 detects the depression of the start button 521 in ST702. If the determining section 604 determines that the start button-on detecting section 602 detects the depression of the start button 521, the determining section 604 instructs each section to execute the following IFAX transmission processing. Namely, in ST703, the scanner control section 200 causes the scanner 15 to scan the original and store the resultant original image to the buffed 601 for scanner. Next, in ST704, the journal creating section 605 creates a journal and stores it to the journal storing area 606. In ST705, the bitmap processing section 607 bitmaps the journal. Then, in ST706, the image compressing section 608 compresses the original image and bitmap data of the journal, respectively, and obtains compressed data. Thereafter, in ST707, the image combining section 609 combines these compressed data. As a result, a journal 82 is superimposed on the header of an original image 81 as shown in FIG. 8.

In ST708, the TIFF converting section 610 converts compressed data combined to a TIFF file, and the e-mail creating section 611 puts this TIFF file to the appended file part of e-mail, and puts the destination mail address to filed of this e-mail. As a result, e-mail to which the original image including the journal is appended is created. Next, in ST709, the mail transmitting section 612 transmits thus created e-mail to the IFAX 8 via the mail server 3 of the transmitting side.

While, in ST702, the determining section 604 determines that the depression of the start button 521 is not detected, the determining section 604 determines whether or not the scanner-on button detecting section 603 detects the depression of scanner button 522 in ST710. If the determining section 604 determines that the scanner-on button detecting section 603 detects the depression of scanner button 522, the determining section 604 instructs each section to execute the following network scanner processing. Namely, in ST711, the scanner control section 200 causes the scanner 15 to scan the original and store the resultant original image to the buffer 601 for scanner. Next, in ST712, the image compressing section 608 compresses the original image, and obtains compressed data. Thereafter, in ST713, the TIFF converting section 610 converts these compressed data to a TIFF file, and the e-mail creating section 611 puts this TIFF file to the appended file part of e-mail, and puts the destination mail address [To:] filed of this e-mail. As a result, e-mail to which the original image including no journal is appended is created. Next, in ST714, the mail transmitting section 612 transmits thus created e-mail to the PC 4 directly.

In the above-mentioned first embodiment, in the case of receiving IFAX mail, if the mail receiving section receives IFAX mail via the LAN interface 17 in the IFAX processing section 400, a binary converting section converts appended file data included in e-mail to binary data from a text code, whereby obtaining a TIFF file. The obtained TIFF file is decompressed by a TIFF decompressing section, whereby obtaining compressed data. This compressed data is decompressed by an image decompressing section, whereby obtaining raw image data. This raw image data is printed by the printer 16.

As explained above, according to the IFAX 1 of the first embodiment, the scanner button 522 is provided. After the operator inputs the destination mail address, it is determined whether or not IFAX transmission processing or network scanner processing should be performed based on whether the start button 521 or the scanner button 522 is pressed on. Then, in the case of performing IFAX transmission processing, the journal is superimposed on the original image, and e-mail is transmitted to the IFAX 8 via the mail server 3. As a result, the journal is included in the header of each page when e-mail is printed by IFAX 8. This allows the receiver to know communication managing information such as sender, transmission date, the number of pages, etc., without confirming, e.g., communication log, in the same manner as G3/G4 FAX.

In the case of performing network scanner processing, the IFAX 1 does not perform the creation of journal, bitmapping, compression, and combination with the original image. Therefore, the original image can be transferred to the PC 4 without superimposing the journal thereon. This prevents the trouble in which the journal hinders the PC 4 from dealing with the original image.

Moreover, according to the IFAX 1 of the first embodiment, the operator can cause the IFAX 1 to execute network scanner processing only by depressing the scanner button 522 in place of the start button 521 after inputting the destination mail address. This eliminates the need for complicated operation from the operator.

Moreover, in network scanner processing, the IFAX 1 of the first embodiment transmits e-mail to the PC directly. In there latively large scaled network, the mail server 3 is connected to the other LAN, which is connected to the LAN to which the IFAX 1 and the PC of the destination belong. In this case, if the scanner image is transmitted to the PC via the mail server, the transmission of mail may be delayed. However, the IFAX 1 of the first embodiment makes it possible to send the original image to the PC surely and speedily.

Also, in the network scanner processing, the IFAX 1 directly receives and transmits the image between the IFAX 1 and software for reception, which is running on the PC 4. This makes it unnecessary for the operator to start the mailer on the PC 4 in order to access to the e-mail server 3, and to receive e-mail. For this reason, the operations to be done by the operator are extremely simple.

Further, the IFAX 1 of the first embodiment uses the existing mail transfer protocol such as SMTP in network scanner processing. This makes it possible to largely reduce the time and cost, which are necessary to develop software for transmission and software for reception. Also, the mail transfer protocol such as SMTP is preferable since data can be transferred through a firewall.

However, in the network scanner processing, it is possible to use a data transfer protocol other than the mail transfer protocol. In this case, a data transmitting section, which executes the data transfer protocol other than SMTP, is prepared in addition to the mail transmitting section 612. Here, as the data transfer protocol, Internet standard communication protocols such as FTP, HTTP and a special communication protocol such as Jetsend (Trademark) can be used.

Furthermore, in the first embodiment, it is possible to set image information to a parameter of a predetermined gamma correction efficient at the time of network scanner processing. Also, in general, a millimeter unit is used the facsimile apparatus and an inch unit is used in the PC and the like. Then, the conversion of linear density, that is, millimeter→inch, is performed in the case of sending image information to the PC and the like, and no conversion of linear density may be performed in the case of sending image information to the IFAX.

Second Embodiment

Next, an explanation of the IFAX according to the second embodiment of the present invention will be explained.

Figure 9:
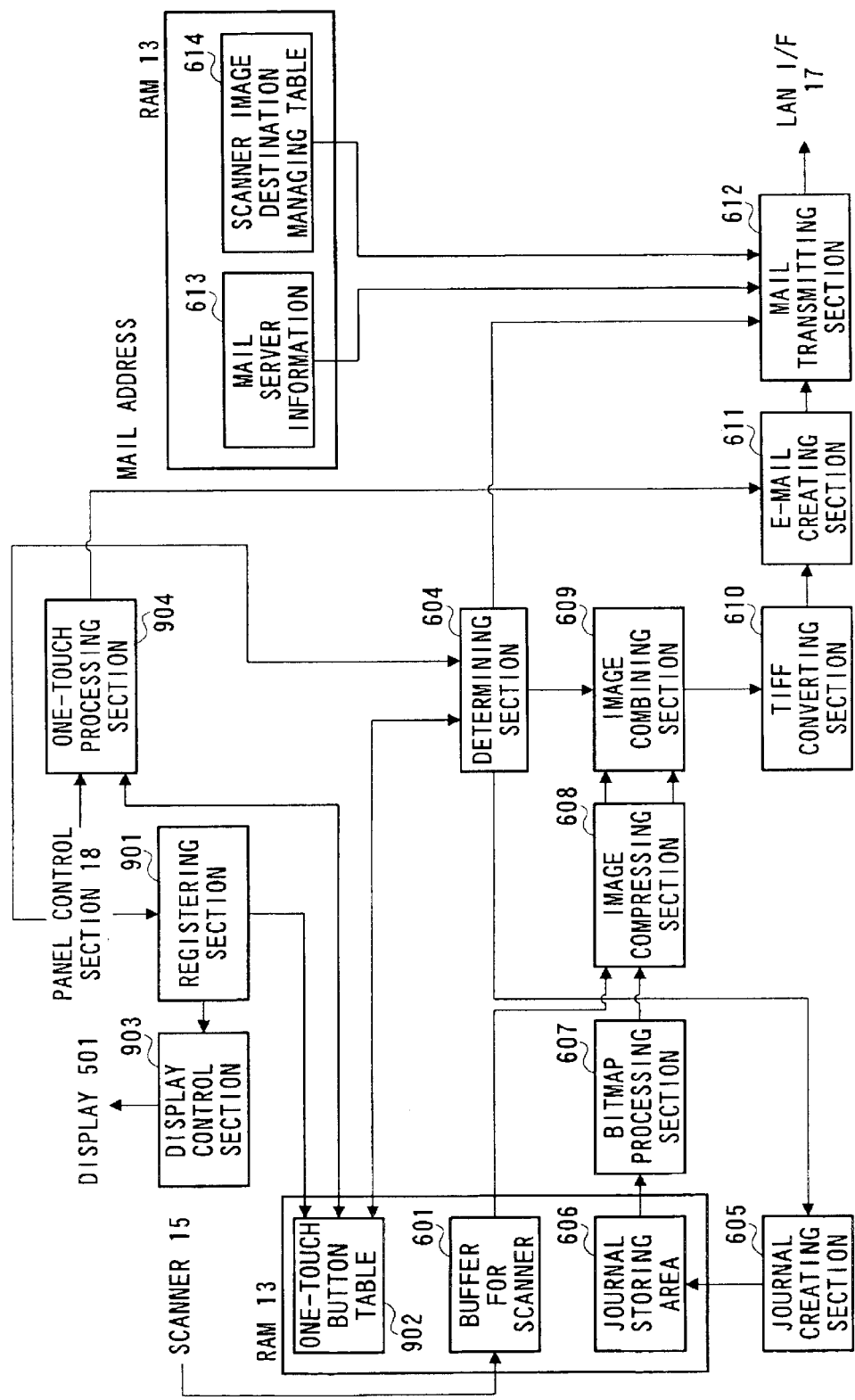
FIG. 9 is a functional block diagram showing an IFAX processing section of an Internet facsimile apparatus according to a second embodiment of the present invention.

FIG. 9 is a functional block diagram showing an IFAX processing section of IFAX the second embodiment of the present invention. In this figure, the same reference numerals are added to the portions common to the first embodiment shown in FIG. 6, and the explanation is omitted.

A registering section 901, which assigns a desired destination mail address to the one-touch button 507 of the panel control section 18 shown in FIG. 5. The registering section 901 controls registration to be done by the operator, and writes the content of registration into a one-touch button table 902. The registering section 901 assigns the destination mail address to the one-touch button 507, and registers whether or not this destination mail address is used for IFAX transmission processing or network scanner processing.

Figure 10:
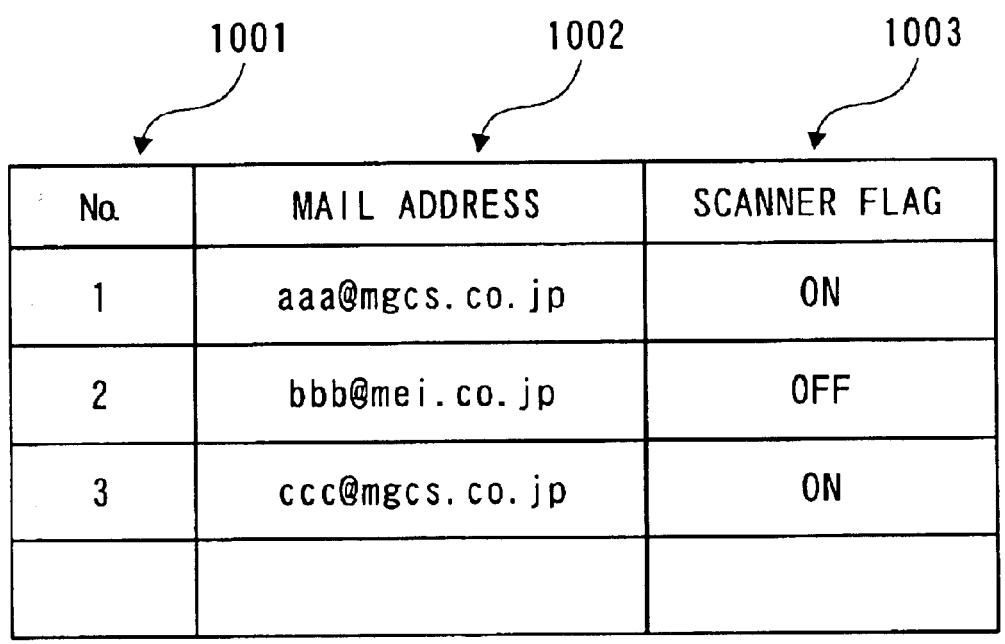
FIG. 10 is a view showing a one-touch button table according to the second embodiment.

As shown in FIG. 10, in the one-touch button table 902, number 1001 of the one touch button 507, a destination mail address 1002, and a scanner flag 1003 are registered to be associated with other. It is shown that this destination mail address is used for network scanner processing when the scanner flag 1003 is on, and that this destination mail address is used for IFAX transmission processing when it is off.

A display control section 903 displays a message for registering the destination mail address 1002 on the display 501 by the control of the registering section 901.

When either one of one-touch buttons 507 is pressed on, a one-touch processing section 904 sends the destination mail address 1002, which corresponds to the one-touch button 507, which has been pressed on, to the e-mail creating section 611 with reference to the one-touch button table 902.

A determining section 905 identifies the number 1001 of the pressed on one-touch button 507, and determines whether or not IFAX transmission processing or network scanner processing should be performed with reference to the one-touch button table 902.

Figure 11:
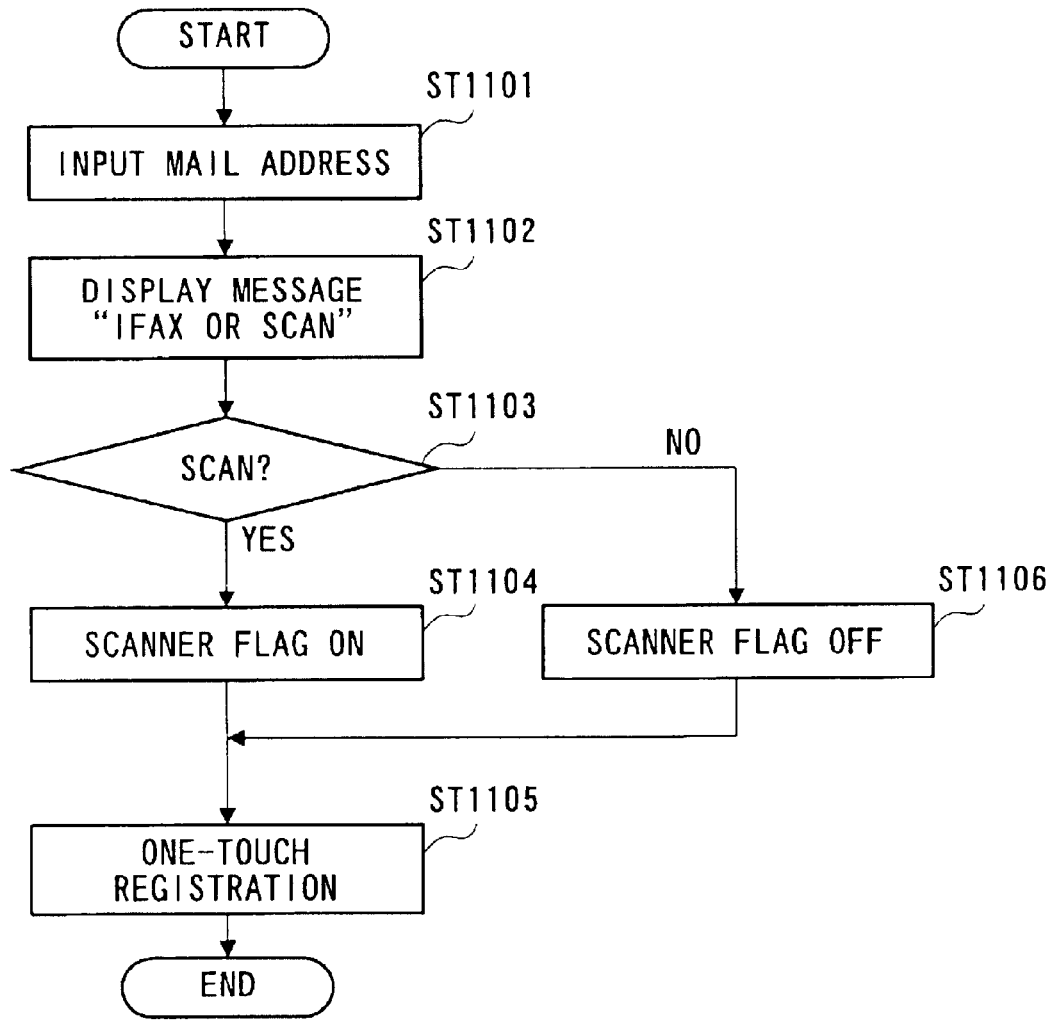
FIG. 11 is a flowchart showing a registering action using the one-touch button of the Internet facsimile apparatus according to the second embodiment.

FIG. 11 is a flowchart showing a registering action using the one-touch button 507 of the IFAX according to the second embodiment.

In ST1101, the destination mail address 1002 is input. Thereafter, the registering section 901 causes the display control section 903 to display the message, that is, "IFAX or SCAN" on the display 501. The operator selects either IFAX or network scanner (SCAN).

In ST1103, the registering section 901 determines whether or not the operator selects the network scanner. If the operator selects the network scanner, the registering section 901 turns on the scanner flag 1003 in ST1104. Thereafter, in ST1105, the registering section 901 registers the destination mail address 1002 to the one-touch button table 902.

While, in ST1103, if the operator selects the IFAX, that is, the network scanner is not selected, the registering section 901 turns off the scanner flag 1003 in ST1106. Thereafter, in ST1105, the registering section 901 registers the destination mail address 1002 to the one-touch button table 902.

Figure 12:
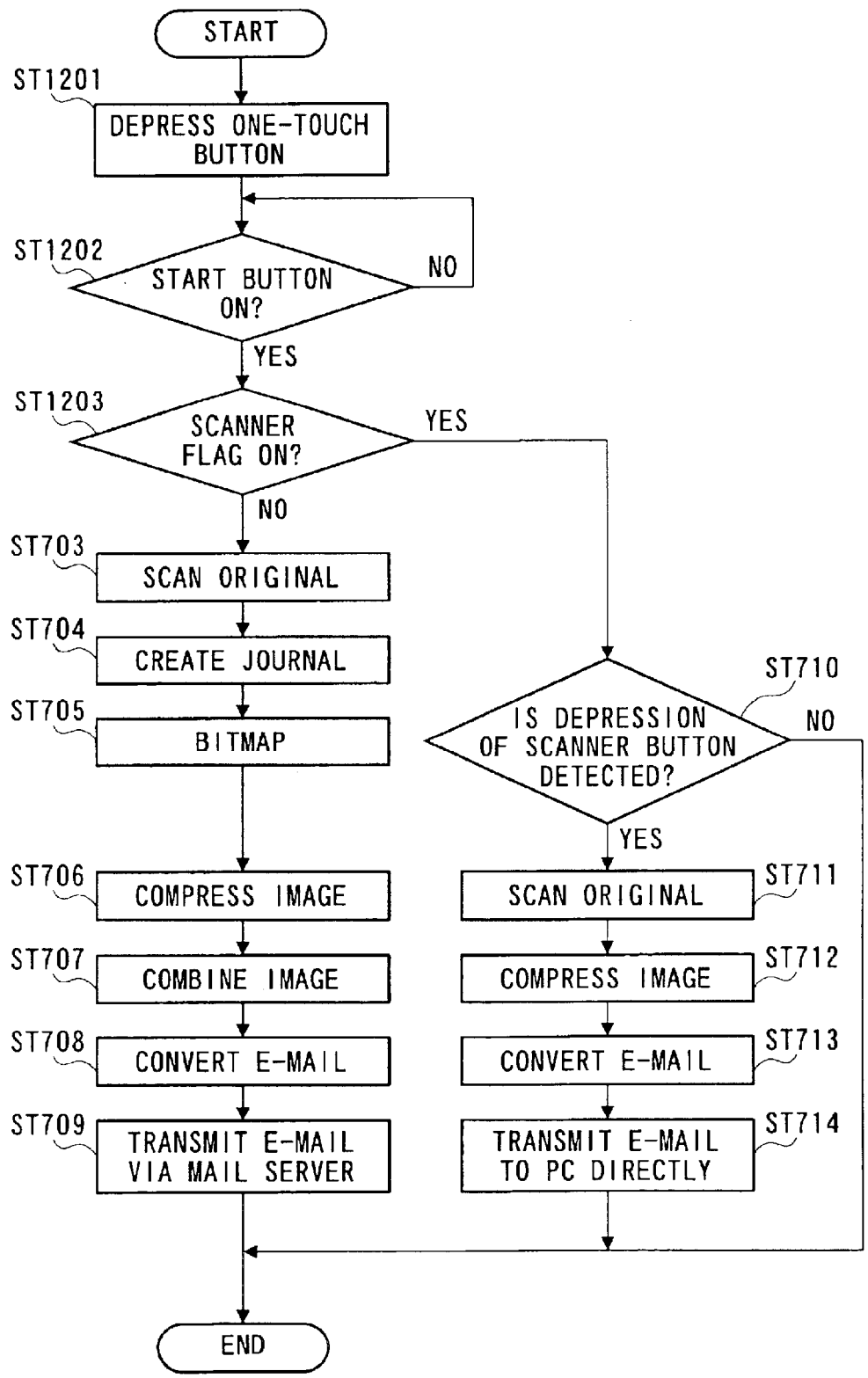
FIG. 12 is a flowchart showing image transmission processing of the Internet facsimile apparatus according to the second embodiment.

Next, an explanation will be given of image transmission processing of the IFAX according to the second embodiment. FIG. 12 is a flowchart showing image transmission processing of the IFAX according to the second embodiment. Regarding the same steps as those of the first embodiment shown in FIG. 7, the same reference numerals are added thereto, and the explanation is omitted.

In ST1201, the determining section 905 detects the depression of one of the one-touch buttons 507, and recognizes this number 1001. The determining section 905 detects the depression of the start button 521 in ST1202, and determines whether or not the scanner flag 1003, which corresponds to the number 1001 of the pressed on one-touch button 507 is on with reference to the one-touch button table 902 in ST1203. Here, if the scanner flag 1003 is off, the determining section 905 instructs each section to execute IFAX transmission processing of ST703 to ST709. While, if the scanner flag 1003 is pressed on, the determining section 905 instructs each section to execute network scanner processing of ST710 to ST713.

As explained above, the IFAX according to the second embodiment is different from the first embodiment in the point that a distinction between IFAX transmission processing and network scanner processing is made by use of the one-touch button function. According to the second embodiment, the scanner flag 1003 is added to the one-touch button table 902. Then, if this scanner flag 1003 is off, it is determined that IFAX transmission processing is performed. While, if the scanner flag 1003 is it is determined that network scanner processing is performed. As a result, the operator has only to depress the one-touch button 507 and the start button 521 in the same manner as the normal facsimile transmission. This eliminates the need for considering the content of processing. Also, in the second embodiment, since the scanner button 522 as used in the first embodiment is not always needed, an increase in the number of components and a change in a mold are not generated. This makes it possible to reduce the IFAX developing cost and the manufacturing cost.

The second embodiment explained the case in which the scanner flag was added to the registering table for one-touch button. However, the scanner flag is added to the registering table for the abbreviated dial, whereby the same processing as the second embodiment may be performed.

Third Embodiment

Figure 13:
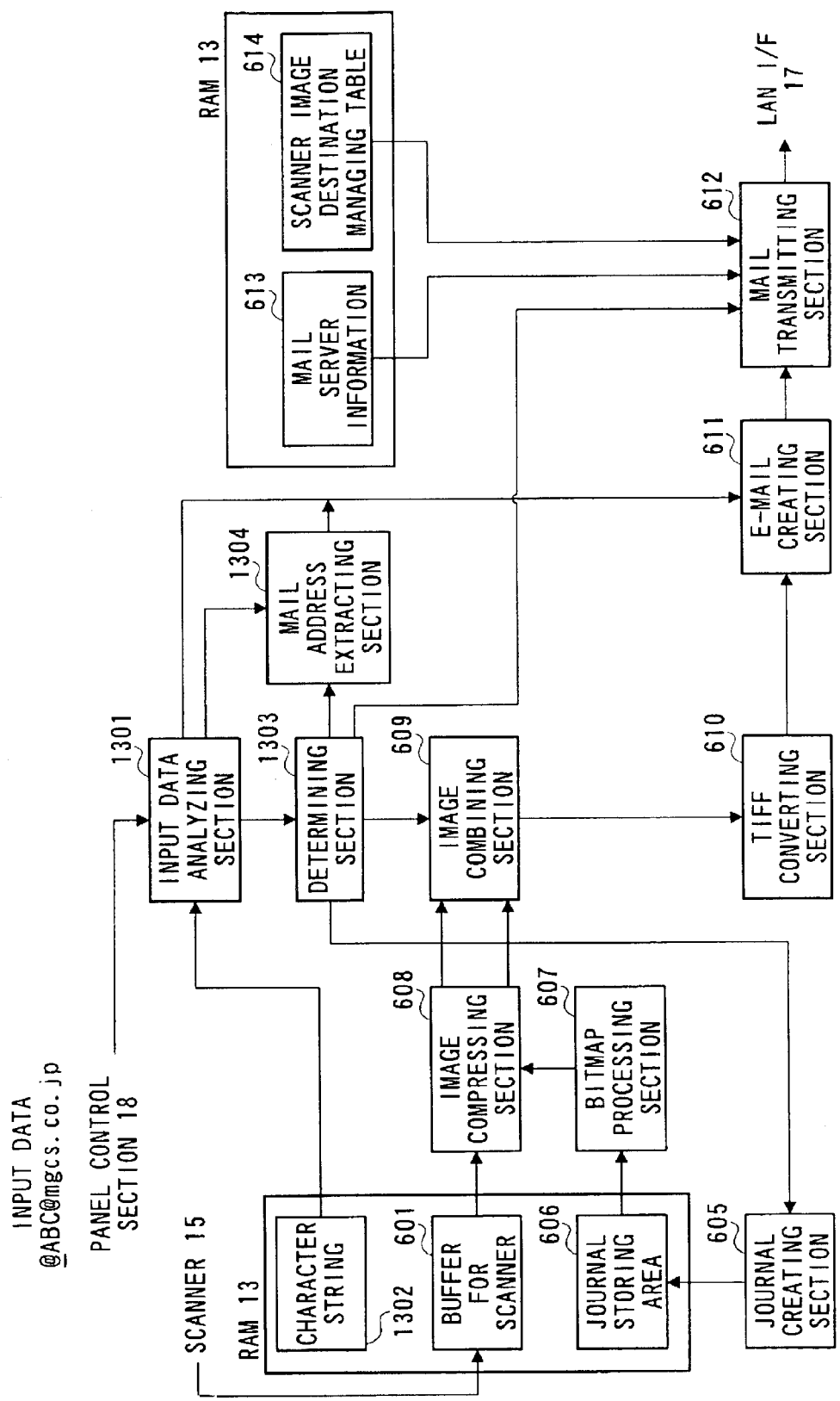
FIG. 13 is a functional block diagram showing an IFAX processing section of an Internet facsimile apparatus according to a third embodiment of the present invention.

Next, an explanation will be given of the IFAX according to the third embodiment of the present invention. FIG. 13 is a functional block diagram showing the IFAX processing section of the IFAX according to the third embodiment. Regarding the same configuration as those of the first embodiment shown in FIG. 6, the same reference numerals are added thereto, and the explanation is omitted.

An input data analyzing section 1301 analyzes input data input from the panel control section 18, and determines whether or not the input data is data in which a specific character string (@ in this example) 1302 is added to the head of the destination mail address.

A determining section 1303 determines whether IFAX transmission processing or network scanner processing should be performed depending on the result of the analysis on whether or not the specific character string 1302 is included in the input data.

If the input data includes the specific character string 1302, a mail address extracting section 1304 extracts a destination mail address from input data, and sends it to the e-mail creating section 611.

In the IFAX according to the third embodiment, the operator normally inputs the destination mail address when performing IFAX transmission processing. While, the operator adds the specific character string (@ in this example) to the head of the user name of the destination mail address when performing network scanner processing.

Figure 14:
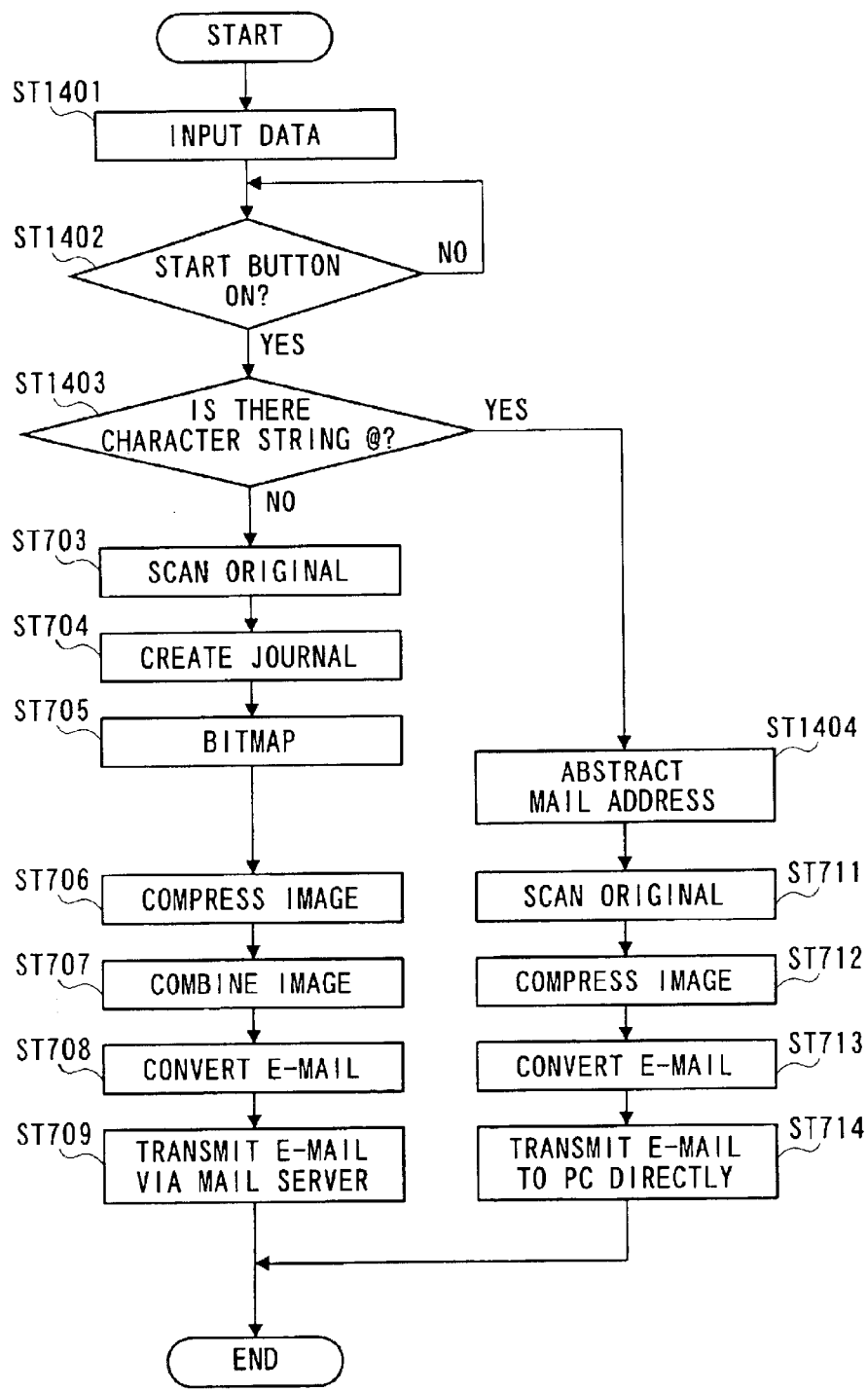
FIG. 14 is a flowchart showing image transmission processing of the Internet facsimile apparatus according to the third embodiment.

The following will explain the image transmission processing of the IFAX according to the third embodiment. FIG. 14 is a flowchart showing image transmission processing of the IFAX according to the third embodiment. Regarding the same steps as those of the first embodiment shown in FIG. 7, the same reference numerals are added thereto, and the explanation is omitted.

In ST1401, the input data analyzing section 1301 receives input data from the panel control section 18. Next, in ST1402, if the input data analyzing section 1301 detects the depression of start button 521, the input data analyzing section 1301 analyzes input data. Then, in ST1403, a determining section 1303 determines whether or not the character string 169 1302 is included in input data based on the result of the analysis of the input data analyzing section 1301.

If the determining section 1303 determines that no character string @ 1302 is included in input data in ST1403, the determining section 1303 instructs each section to execute IFAX transmission processing of ST703 to ST709. While, if the determining section 1303 determines that the character string @ 1302 is included in input data in ST1403, the determining section 1303 instructs each section to execute network scanner processing of ST710 to ST713. In ST1404, the mail address extracting section 1304 extracts the mail address from input data, and sends it to the e-mail generating section 611. In other words, the mail address extracting section 1304 deletes the specific character string 1302 in the input data.

As explained above, the IFAX according to the third embodiment is different from the first embodiment in the point that a distinction between IFAX transmission processing and network scanner processing is made based on whether or not the character string @ 1302 is included in the data input by the operator, that is, whether or not the character string @ 1302 is added to the destination mail address. According to the third embodiment, the operator can instructs the content of processing only by inputting the specific character string @ before inputting the destination mail address. Moreover, since the processing is not determined unlike the case of the second embodiment, the operator can instructs the processing that the operator wishes regardless of the content of registration. Furthermore, in the third embodiment, since the scanner button 522 as used in the first embodiment is not always needed, an increase in the number of components and a change in a mold are not generated. This makes it possible to reduce the IFAX developing cost and the manufacturing cost.

In the third embodiment explained the case in which the character string was added to the head of the destination mail address. Instead of this, the character string may be superimposed on the destination mail address, or may be added to its tail end.

Fourth Embodiment

Next, an explanation will be given of the IFAX according to the fourth embodiment of the present invention.

Figure 15:
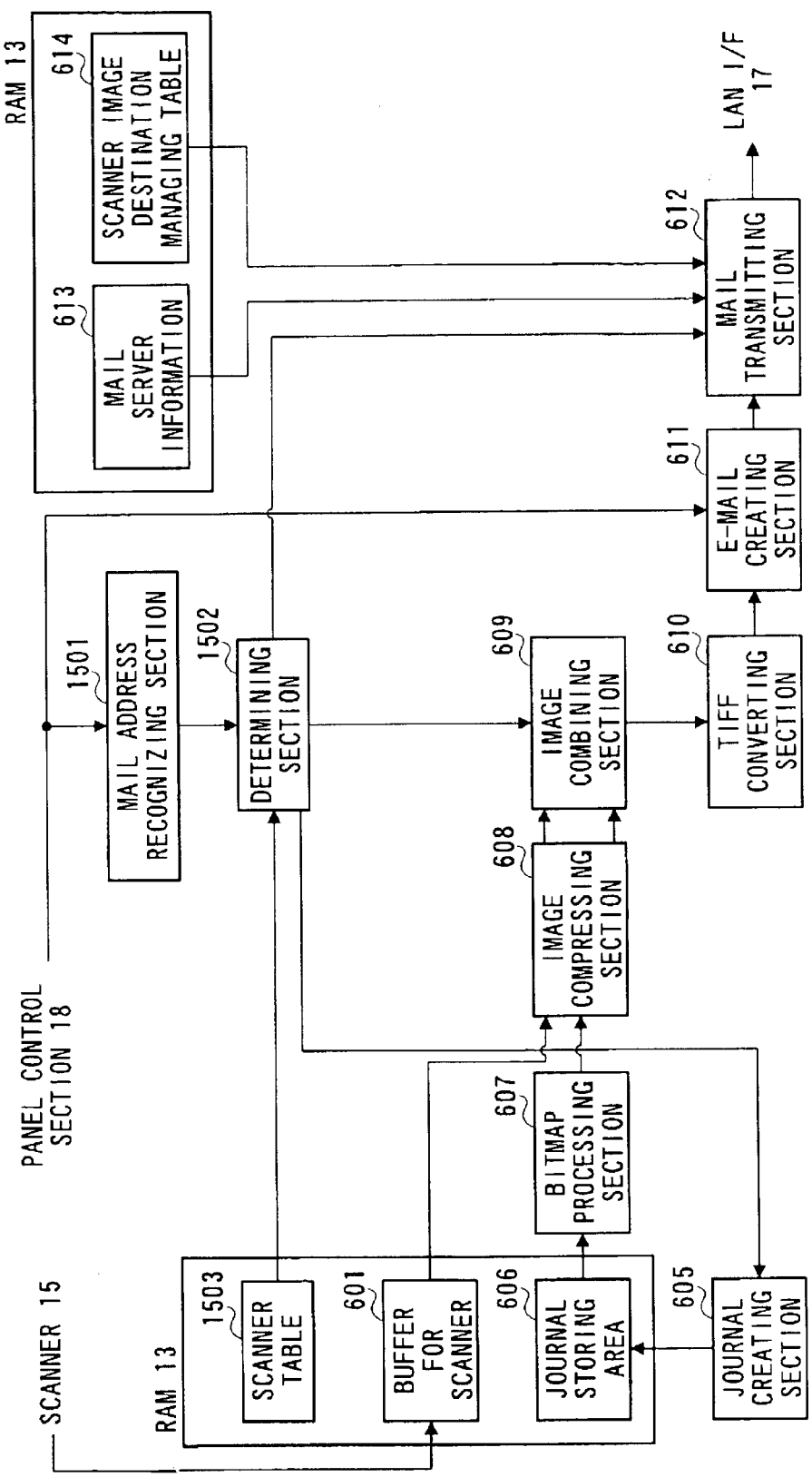
FIG. 15 is a functional block diagram showing an IFAX processing section of an Internet facsimile apparatus according to a fourth embodiment of the present invention.

FIG. 15 is a functional block diagram showing the IFAX processing section of the IFAX according to the fourth embodiment. Regarding the same configurations as those of the first embodiment shown in FIG. 6, the same reference numerals are added thereto, and the explanation is omitted.

A mail address recognizing section 1501 recognizes the destination mail address input from the panel control section 18, and sends it to a determining section 1502. In a scanner table 1503, there is registered the destination mail address, which is used as a destination for network scanner processing. The determining section 1502 determines whether or not whether IFAX transmission processing or network scanner processing should be performed depending on whether or not the destination mail address, which is received from the mail address recognizing section 1501, is registered in the scanner tables 1503.

The following will explain image transmission processing of the IFAX according to the fourth embodiment.

Figure 16:
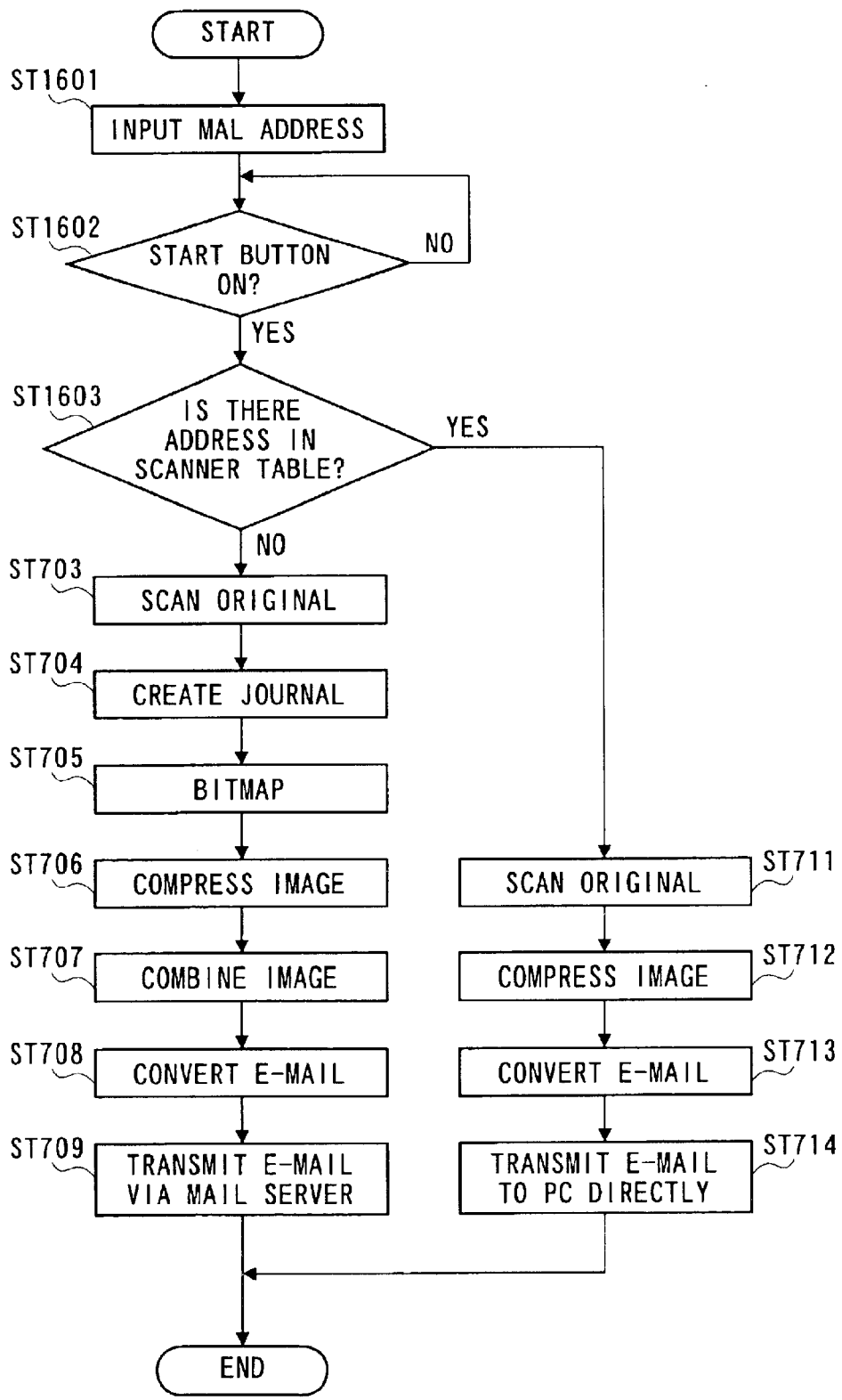
FIG. 16 is a flowchart showing image transmission processing of the Internet facsimile apparatus according to the fourth embodiment.

FIG. 16 is a flowchart showing image transmission processing of the IFAX according to the fourth embodiment. Regarding the same steps as those of the first embodiment shown in FIG. 7, the same reference numerals are added thereto, and the explanation is omitted.

In ST1601, the mail address recognizing section 1501 receives the destination mail address from the panel control section 18. Next, in ST1602, if the mail address recognizing section 1501 detects the depression of start button 521, the mail address recognizing section 1501 recognizes the destination mail address, and sends it to the determining section 1502.

Next, in ST1603, the determining section 1502 determines whether or not there is the destination mail address in the scanner table 1503. If the determining section 1502 determines that there is no destination mail address in the scanner table 1503, the determining section 1502 instructs each section to execute IFAX transmission processing of ST703 to ST709. While, if the determining section 1502 determines that there is the destination mail address in the scanner table 1503, the determining section 1502 instructs each section to execute network scanner processing of ST710 to ST713.

As explained above, the IFAX according to the fourth embodiment is different from the first embodiment in the point that a distinction between IFAX transmission processing and network scanner processing is made based on whether or not there is the destination mail address input by the operator in the scanner table 1503. According to the fourth embodiment, the operator has only to input the destination mail address and there is no need to consider the selection of the processing content. Furthermore, in the fourth embodiment, since the scanner button 522 as used in the first embodiment is not always needed, an increase in the number of components and a change in a mold are not generated. This makes it possible to reduce the IFAX developing cost and the manufacturing cost.

In the fourth embodiment, the destination mail address to be used in network scanner processing is registered in the scanner table 1502. However, the determining section 1502 may determine that network scanner processing is performed when a domain name of the input destination mail address matches one, which has been registered.

Also, as opposed to the case of the fourth embodiment, the determining section 1502 may determine that IFAX transmission processing is performed when the destination mail address is registered in a table.

Fifth Embodiment

Next, an explanation will be given of the IFAX according to the fifth embodiment of the present invention.

Figure 17:
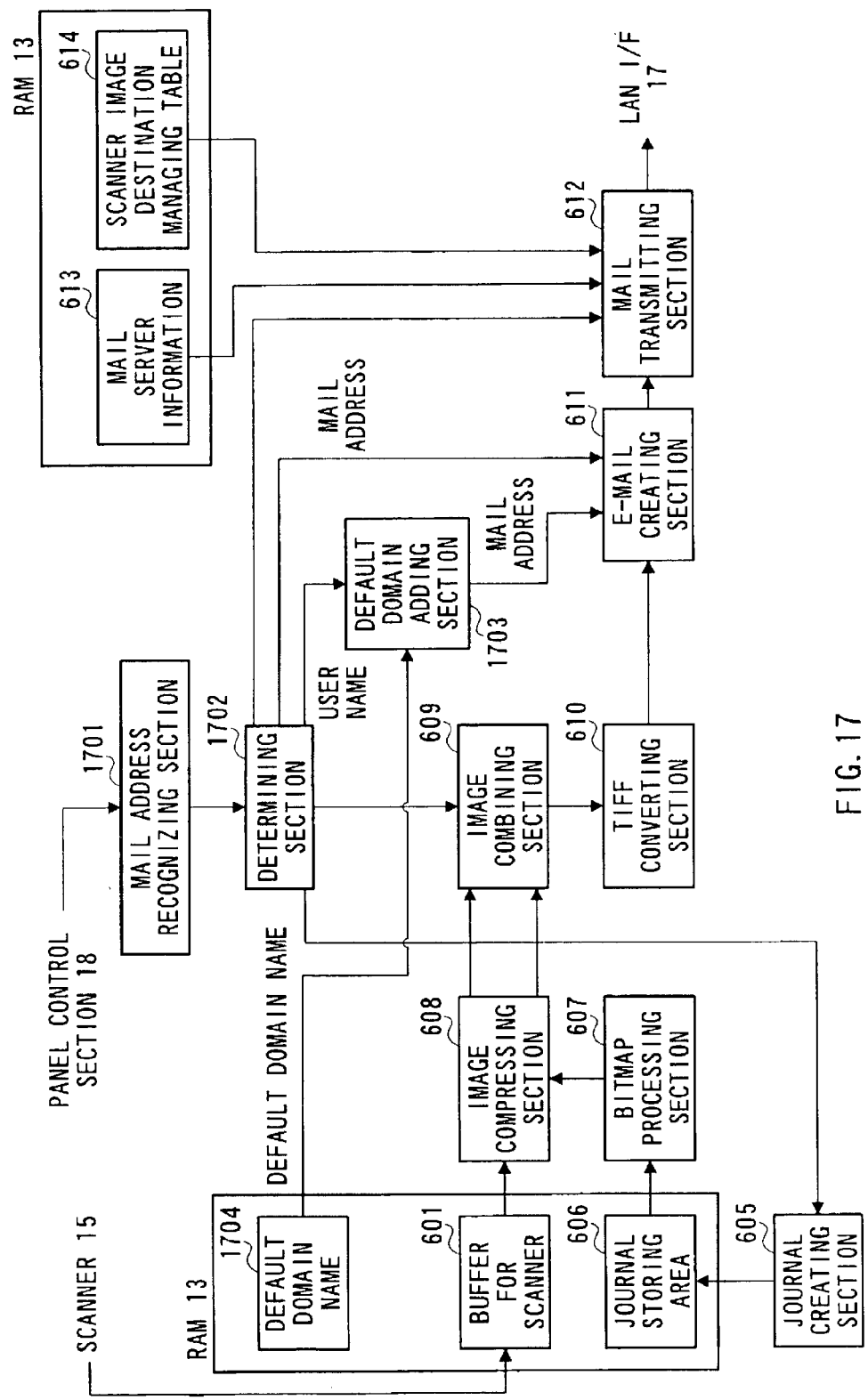
FIG. 17 is a functional block diagram showing an IFAX processing section of an Internet facsimile apparatus according to a fifth embodiment of the present invention.

FIG. 17 is a functional block diagram showing the IFAX processing section of the IFAX according to the fifth embodiment. Regarding the same configurations as those of the first embodiment shown in FIG. 6, the same reference numerals are added thereto, and the explanation is omitted.

An input data analyzing section 1701 analyzes input data, and sends the result to a determining section 1702. The input data analyzing section 1701 analyzes whether or not input data includes an at sign "@", that is, whether input data is a user name or a full mail address.

The determining section 1702 determines the later processing on the basis of the result of analysis done by the input data analyzing section 1701.

If the input data is the user name, a default domain adding section 1703 adds a default domain name 1704 stored in e.g., the RAM 13 to this user name so as to obtain a mail address, and sends it to the e-mail creating section 611.

Figure 18:
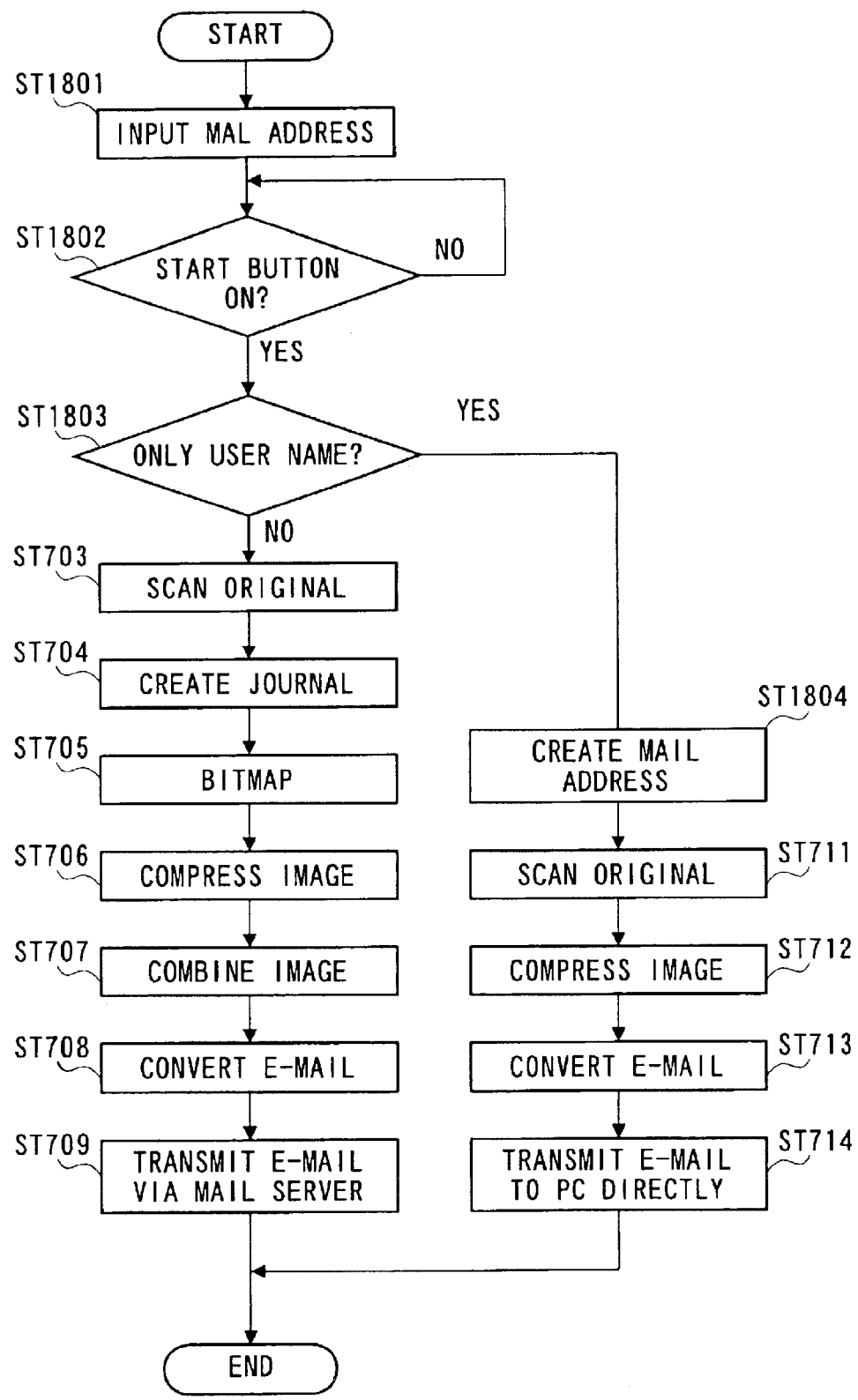
FIG. 18 is a flowchart showing image transmission processing of the Internet facsimile apparatus according to the fifth embodiment.

The following will explain image transmission processing of the IFAX according to the fifth embodiment. FIG. 18 is a flowchart showing image transmission processing of the IFAX according to the fourth embodiment. Regarding the same steps as those of the first embodiment shown in FIG. 7, the same reference numerals are added thereto, and the explanation is omitted.

After placing the original on the original on the original plate 41 of IFAX 1 as shown in FIG. 4, the operator depresses the Internet button 506 of the panel control section 18 so as to change the input mode of the panel control section 18 to a character string input mode. This allows the operator to input the character strings such as alphabets, signs, and the like by use of the one-touch buttons 507 of the panel control section 18 and the program button 509.

In ST1801, the input data analyzing section 1701 receives input data from the panel control section 18 by the operaor. Next, in ST1802, if the start button 521 is depressed, the input data analyzing section 1701 analyzes input data. The input data analyzing section 1701 sends this result of analysis to the determining section 1702.

In ST1803, the determining section 1702 determines whether or not an at sign "@" is included in input data. If the at sign is not included therein, the determining section 1702 determines that input data is a user name of the mail address.

Here, if the determining section 1702 determines that input data is the full mail address and is not the user name, the determining section 1702 instructs each section to execute the FAX transmission processing of ST703 to ST709. While, if the determining section 1702 determines that input data is the user name, the determining section 1702 instructs each section to execute the network scanner processing of ST1804 and ST710 to ST713.

In ST1804, the default domain adding section 1703 adds the default domain name 1704 to input data, that is, the user name. The default domain adding section 1703 sends the generated destination mail address to the e-mail creating section 611.

As explained above, the IFAX according to the fifth embodiment is different from the first embodiment in the point that a distinction between IFAX transmission processing and network scanner processing is made based on whether or not input data input before depressing the start key 521 is the user name. According to the fifth embodiment, the operator has only to input the user name when instructing network scanner processing. In the case of using the IFAX as a network scanner, since the PC of destination often belongs to the same domain as the IFAX, this fifth embodiment is extremely useful.

Moreover, according to the fifth embodiment, the input data analyzing section 1701 analyzes input data. Then, if the determining section 1702 determines that input data is the user name on the basis of the result of this analysis, the default domain adding section 1703 fetches the default domain name 1704, and adds it to this user name. This makes it possible to easily input the destination mail address, whose input is relatively difficult, from the panel control section 18 without fail since the operator has only to input only the user name.

Further, since the processing is not determined unlike the case of the second embodiment, the operator can instructs the processing that the operator wishes regardless of the content of registration.

Furthermore, in the fifth, since the scanner button 522 as used in the first embodiment is not always needed, an increase in the number of components and a change in a mold are not generated. This makes it possible to reduce the IFAX developing cost and the manufacturing cost.

The present invention is not limited to the above first to fifth embodiments. This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software are. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

As explained above, according to the present invention, in the case of using the image transmitting apparatus for communications, communication managing information is superimposed on page information, while in the case of using the image transmitting apparatus for image scanning, no communication managing information is superimposed on image information. This makes it possible to prevent the trouble in which communication managing information hinders a receiver side from seeing the image in the case of using the image transmitting apparatus for image scanning since no communication managing information is superimposed on image information. As a result, the present invention can provide an apparatus and a method for transmitting image which are applicable to both a network scanner and an Internet facsimile apparatus.

The present invention is not limited to the above described embodiments, and various variations and modifications may be possible without departing from the scope of the present invention.

This application is based on the Japanese Patent Application No. HEI11-287897 filed on Oct. 8, 1999, entire content of which is expressly incorporated by reference herein.

What is claimed is:

1. An image transmitting apparatus connected to an image data source, and having selectable Internet facsimile transmission and scanner functions, the Internet facsimile transmission function forwarding data to a destination by an Internet, the scanner function forwarding data to a destination via a LAN without accessing the Internet, the image transmitting apparatus comprising;
    a journal creator configured to create a journal;
    a controller configured, when the Internet facsimile transmission function is selected, to combine the image data from the image data source with the journal, to transform the combined image data into a data format for an e-mail transmission, to generate an e-mail to which the transformed and combined image data is attached, and to transmit the e-mail to the destination, and when the scanner function is selected, to transform the image data from the image data source into the data format for an e-mail transmission without combining the image data with the journal, to generate an e-mail to which the transformed image data is attached, and to transmit the e-mail to the destination.

2. The image transmitting apparatus according to claim 1, wherein the journal comprises at least one of a header and a footer.

3. The image transmitting apparatus according to claim 1, wherein the journal includes at least one of sender information, transmission date, transmission time, destination information, and page information.

4. The image transmitting apparatus according to claim 1, wherein the image data source comprises a scanner provided to the image transmitting apparatus.

5. The image transmitting apparatus according to claim 1, wherein the data format for e-mail transmission is TIFF file.

6. The image transmitting apparatus according to claim 1, wherein the controller transmits the e-mail to the destination through a mail server on the LAN connected to the image transmitting apparatus when the Internet facsimile transmission function is selected and transmits the e-mail to the destination without utilizing the server on the LAN connected to the image transmitting apparatus when the scanner function is selected.

7. The image transmitting apparatus according to claim 1, further comprising an Internet facsimile button and a scanner button, and the controller judges that the Internet facsimile transmission function is selected when the Internet facsimile button is actuated and judges that the scanner function is selected when the scanner button is actuated.

8. An image transmitting apparatus connected to an image data source, and having selectable Internet facsimile transmission and scanner functions, one of the Internet facsimile transmission function and the scanner function being selected by a user of the image transmitting apparatus, the image transmitting apparatus comprising;

a journal creator configured to create a journal;

a controller configured, when the Internet facsimile transmission function is selected, to combine the image data from the image data source with the journal, to transform the combined image data into a data format for an e-mail transmission, to generate an e-mail to which the transformed and combined image data is attached, and to transmit the e-mail to the destination, and when the scanner function is selected, to transform the image data from the image data source into the data format for an e-mail transmission without combining the image data with the journal, to generate an e-mail to which the transformed image data is attached, and to transmit the e-mail to the destination.

9. The image transmitting apparatus according to claim 8, wherein the journal comprises at least one of a header and a footer.

10. The image transmitting apparatus according to claim 8, wherein the journal includes at least one of sender information, transmission date, transmission time, destination information, and page information.

11. The image transmitting apparatus according to claim 8, wherein the image data source comprises a scanner provided to the image transmitting apparatus.

12. The image transmitting apparatus according to claim 8, wherein the data format for e-mail transmission is TIFF file.

13. The image transmitting apparatus according to claim 8, wherein the controller transmits the e-mail to the destination through a mail server on the LAN connected to the image transmitting apparatus when the Internet facsimile transmission function is selected and transmits the e-mail to the destination without utilizing the server on the LAN connected to the image transmitting apparatus when the scanner function is selected.

14. The image transmitting apparatus according to claim 8, further comprising an Internet facsimile button and a scanner button, and the controller judges that the Internet facsimile transmission function is selected when the Internet facsimile button is actuated and judges that the scanner function is selected when the scanner button is actuated.

15. An image transmitting apparatus having selectable Internet facsimile transmission and scanner functions, the image transmitting apparatus comprising;

a LAN interface configured to connect to a LAN;

a control panel configured to select at least one of the Internet facsimile transmission function and the scanner function, based on a user's input;

a scanner configured to scan image data;

a journal creating section configured to create a journal;

a controller configured, when the Internet facsimile transmission function is selected, to combine the scanned image data with the journal, to transform the combined image data into a data format for an e-mail transmission, to generate an e-mail to which the transformed and combined image data is attached, and to transmit the e-mail to the destination via the LAN interface by accessing the Internet, and when the scanner function is selected, to transform the scanned image data into the data format for an e-mail transmission without combining the image data with the journal, to generate an e-mail to which the transformed image data is attached, and to transmit the e-mail to the destination via the LAN interface without accessing the Internet.

16. The image transmitting apparatus according to claim 15, wherein the journal comprises at least one of a header and a footer.

17. The image transmitting apparatus according to claim 15, wherein the journal includes at least one of sender information, transmission date, transmission time, destination information, and page information.

18. The image transmitting apparatus according to claim 15, wherein the data format for e-mail transmission is TIFF file.

19. The image transmitting apparatus according to claim 15, wherein the controller transmits the e-mail to the destination through a mail server on the LAN connected to the image transmitting apparatus when the Internet facsimile transmission function is selected and transmits the e-mail to the destination without utilizing the server on the LAN connected to the image transmitting apparatus when the scanner function is selected.

20. The image transmitting apparatus according to claim 15, wherein the control panel includes an Internet facsimile button and a scanner button, and the controller judges that the Internet facsimile transmission function is selected when the Internet facsimile button is actuated by the control panel and judges that the scanner function is selected when the scanner button is actuated by the control panel.

21. An image transmitting method, utilizing an Internet facsimile transmission function and a scanner function, the Internet facsimile transmission function forwarding data to a destination by an Internet, the scanner function forwarding data to a destination via a LAN without accessing the Internet, the image transmitting method comprising;

selecting one of the Internet facsimile transmission function and the scanner function;

combining a scanned image data with a journal, transforming the combined image data into a data format for an e-mail transmission, generating an e-mail to which the transformed and combined image data is attached, and transmitting the e-mail to the destination, in response to selection of the Internet facsimile transmission function; and transforming the scanned image data into the data format for an e-mail transmission without combining the image data with the journal, generating an e-mail to which the transformed image data is attached, and transmitting the e-mail to the destination, in response to selection of the scanner function.

22. The image transmitting apparatus according to claim 21, wherein the journal comprises at least one of a header and a footer.

23. The image transmitting apparatus according to claim 21, wherein the journal includes at least one of sender information, transmission date, transmission time, destination information, and page information.

24. An image transmitting method, utilizing an Internet facsimile transmission function and a scanner function, one of the Internet facsimile transmission function and the scanner function being selected by a user of the image transmitting apparatus, the image transmitting method comprising;

selecting one of the Internet facsimile transmission function and the scanner function;

combining a scanned image data with a journal, transforming the combined image data into a data format for an e-mail transmission, generating an e-mail to which the transformed and combined image data is attached, and transmitting the e-mail to the destination, in response to selection of the Internet facsimile transmission function; and transforming the scanned image data into the data format for an e-mail transmission without combining the scanned image data with the journal, generating an e-mail to which the transformed image data is attached, and transmitting the e-mail to the destination, in response to selection of the scanner function.

25. The image transmitting apparatus according to claim 24, wherein the journal comprises at least one of a header and a footer.

26. The image transmitting apparatus according to claim 24, wherein the journal includes at least one of sender information, transmission date, transmission time, destination information, and page information.

27. An image transmitting method, utilizing an Internet facsimile transmission function and a scanner function, the image transmitting method comprising;

selecting at least one of the Internet facsimile transmission function and the scanner function, based on a user's input;

scanning image data;

combining the scanned image data with a journal, transforming the combined image data into a data format for an e-mail transmission, generating an e-mail to which the transformed and combined image data is attached, and transmitting the e-mail to the destination via the LAN interface by accessing the Internet, in response to selection of the Internet facsimile transmission function; and transforming the scanned image data into the data format for an e-mail transmission without combining the scanned image data with the journal, generating an e-mail to which the transformed image data is attached, and transmitting the e-mail to the destination via the LAN interface without accessing the Internet, in response to selection of the scanner function.

28. The image transmitting apparatus according to claim 27, wherein the journal comprises at least one of a header and a footer.

29. The image transmitting apparatus according to claim 27, wherein the includes at least one of sender information, transmission data, transmission time, destination information, and page information.

* * * * *